United States Patent [19]
Simpson

[11] Patent Number: 6,139,454
[45] Date of Patent: Oct. 31, 2000

[54] HYDRAULIC TENSIONER WITH PLASTIC CAP CHECK VALVE OR VENT

[75] Inventor: Roger T. Simpson, Ithaca, N.Y.

[73] Assignee: BorgWarner Inc., Troy, Mich.

[21] Appl. No.: 09/321,450

[22] Filed: May 27, 1999

Related U.S. Application Data

[60] Provisional application No. 60/101,216, Sep. 21, 1998.

[51] Int. Cl.[7] .................................................. F16H 7/08
[52] U.S. Cl. ............................ 474/110; 474/109; 474/111
[58] Field of Search ...................................... 474/101, 109, 474/110, 133, 135, 136, 138, 111, 117

[56] References Cited

U.S. PATENT DOCUMENTS

| | | | |
|---|---|---|---|
| 3,802,286 | 4/1974 | Winklhofer et al. .................... | 474/111 |
| 4,507,103 | 3/1985 | Mittermeier et al. .................... | 474/110 |
| 4,743,224 | 5/1988 | Yoshikawa et al. ................. | 474/109 X |
| 4,792,322 | 12/1988 | Goppelt et al. ........................... | 474/136 |
| 4,826,470 | 5/1989 | Breon et al. ............................... | 474/110 |
| 4,850,941 | 7/1989 | Sosson ..................................... | 474/110 |
| 5,197,420 | 3/1993 | Arnold et al. ........................ | 474/111 X |
| 5,346,436 | 9/1994 | Hunter et al. ............................ | 474/110 |
| 5,352,159 | 10/1994 | Suzuki et al. ............................ | 474/110 |
| 5,595,549 | 1/1997 | Jarrand .................................. | 474/110 X |
| 5,628,701 | 5/1997 | Dembosky et al. ................. | 474/110 X |
| 5,718,650 | 2/1998 | Smith et al. .............................. | 474/110 |
| 5,842,943 | 12/1998 | Tada ...................................... | 474/110 X |
| 5,879,256 | 3/1999 | Tada ........................................ | 474/110 |
| 5,935,031 | 8/1999 | Tada ........................................ | 474/110 |

*Primary Examiner*—David A. Bucci
*Assistant Examiner*—Marcus Charles
*Attorney, Agent, or Firm*—Sidley & Austin; Greg Dziegielewski

[57] ABSTRACT

A hydraulic tensioner includes a plastic cap vent or check valve at the top of the piston. Oil and air that pass through the top end of the piston accumulate in the space between the plastic cap and the piston. The plastic cap moves small distances in the axial direction to permit the escape of air and oil through the plastic cap to atmosphere. A low rate spring may be used to cause the plastic cap to move away from the piston.

8 Claims, 1 Drawing Sheet

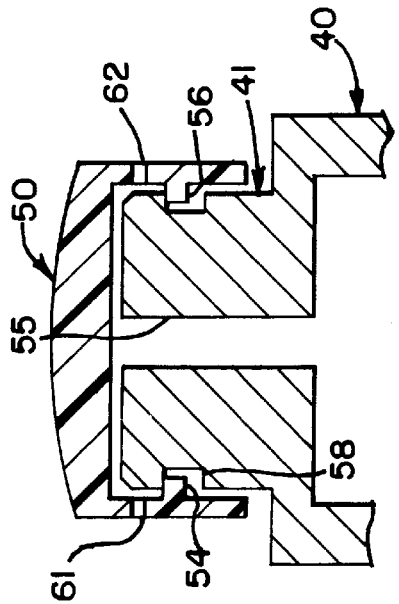
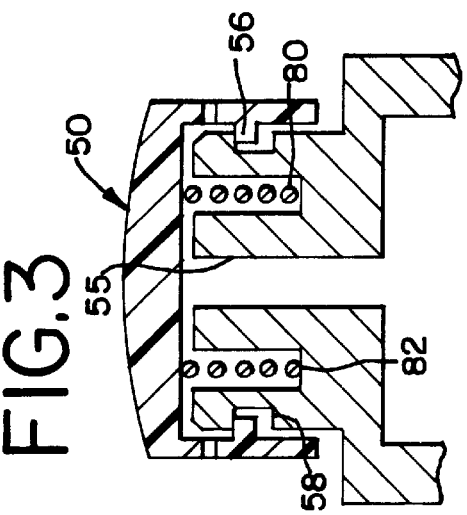
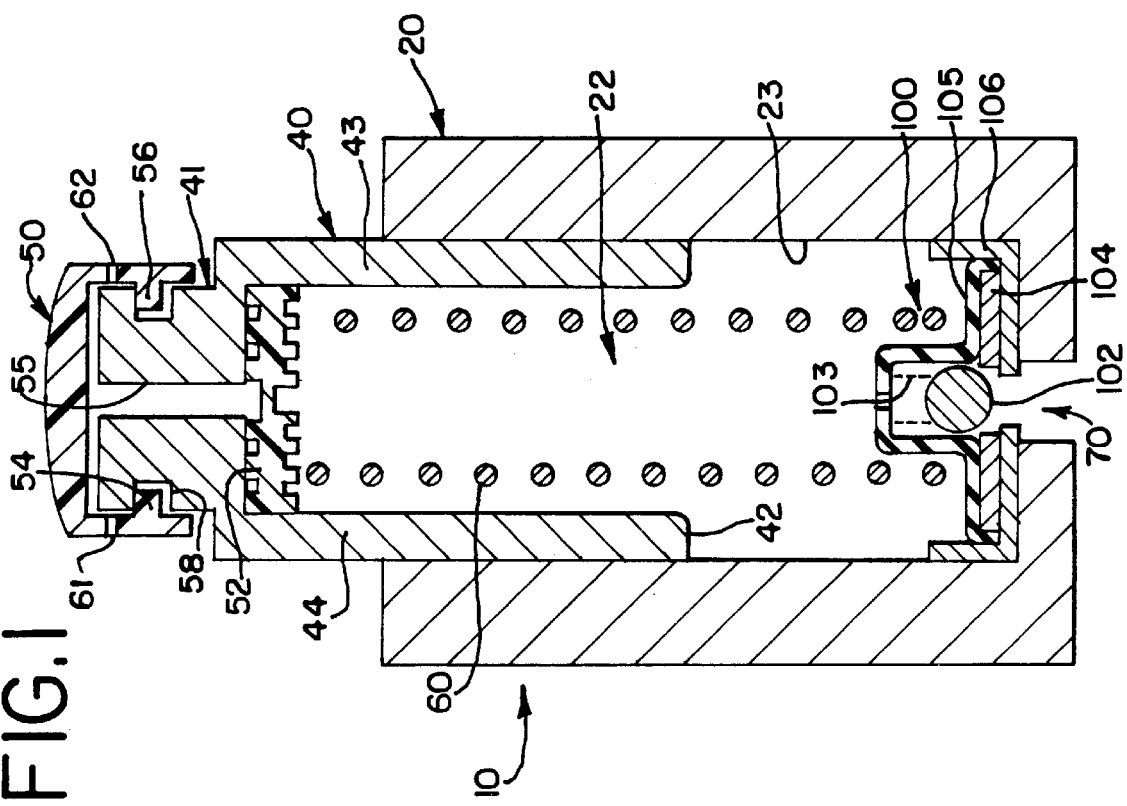

HYDRAULIC TENSIONER WITH PLASTIC CAP CHECK VALVE OR VENT

This application claims the benefit of provisional application U.S. Ser. No. 60/101,216, filed Sep. 21, 1998.

BACKGROUND OF THE INVENTION

This invention relates to a hydraulic tensioner having plastic cap mounted at the top of the piston to serve as a vent for oil and air from the piston. More particularly, this invention relates to a hydraulic tensioner in which a plastic cap is fitted over the nose of the piston and permitted to move small distances with respect to the piston in the axial direction. Oil and air that travel through a tortuous path vent at the top of the piston accumulate inside the cap. At a predetermined pressure, the cap moves upward and the accumulated oil and air are permitted to escape.

The plastic cap vent of the present invention operates on tensioners in which the piston is pointed upward when installed in the engine system as well as on tensioners in which the piston is pointed downward when installed in the engine system. When the engine is not operating, the piston spring will force the piston outward against the tensioner arm, which will provide sufficient force to close the plastic cap against the tip of the piston and prevent escape of oil from the high pressure fluid chamber.

A tensioning device, such as a hydraulic tensioner, is used as a control device for a power transmission chain as a chain travels between a plurality of sprockets. As a chain transmits power from a driving sprocket to a driven sprocket, one portion or strand of the chain between the sprockets will be tight while the other portion of the chain will be slack. In order to impart and maintain a certain degree of tension in the slack portion of the chain, a hydraulic tensioner provides a piston that presses against a tensioner arm or other chain guiding mechanism.

Prevention of excess slack in the chain is particularly important in the case of a chain driven camshaft in an internal combustion engine in that a chain without sufficient tension can skip a tooth or otherwise throw off the camshaft timing, possibly causing damage or rendering the engine inoperative. However, in the harsh environment of an internal combustion engine, various factors can cause fluctuations in the chain tension.

For instance, wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tension. Reverse rotation of an engine, occurring for example in stopping or in failed attempts at starting, can also cause fluctuations in chain tension. For these reasons, a mechanism such as a hydraulic tensioner is desired to ensure the necessary tension on the slack side of the chain.

Hydraulic tensioners are a common method of maintaining proper chain tension. In general, these devices employ a tensioner arm or lever arm that pushes against the chain on the slack side of the chain. This lever arm must push toward the chain, tightening the chain when the chain is slack, and must provide resistive force when the chain tightens.

Typically, a hydraulic tensioner includes a piston in the form of a hollow cylinder. The piston slides within a bore in the housing and is biased outward from the housing in the direction of the tensioner arm and chain by a piston spring. The interior of the piston forms a high pressure fluid chamber with the bore or opening in the housing. The high pressure chamber is connected through a one way check valve to a low pressure chamber or reservoir, which provides or is connected to an exterior source of hydraulic fluid.

Upon start-up, the force of the spring on the piston causes the piston to move further outward as the chain begins to move. Outward movement of the piston creates a low pressure condition in the high pressure fluid chamber, or pressure differential across the inlet check valve. Accordingly, the inlet check valve opens and permits the flow of fluid from the reservoir, or low pressure chamber, into the high pressure chamber. When the high pressure chamber is sufficiently filled with fluid, the force on the chain that moves the piston inward will be balanced by the outward force from the spring and the resistance force of the fluid in the chamber. The force of the chain against the fluid in the chamber also causes the check valve to close, which prevents further addition of fluid to the chamber.

Various types of hydraulic tensioners are described in Suzuki et al., U.S. Pat. No. 5,352,159, Goppett et al., U.S. Pat. No. 4,792,322, and Sosson U.S. Pat. No. 4,850,941. The hydraulic tensioner of Sosson U.S. Pat. No. 4,850,941, has a check valve mounted in the piston, providing a relatively small high pressure chamber. The high pressure chamber is defined by part of the cavity formed in the housing and the piston. The tensioner does not have a spring between the body and the piston or a means for permitting discharge of air from the chamber.

U.S. Pat. No. 4,826,470 discloses a hydraulic tensioner with a check valve mounted in the nose of a piston. The check valve permits air to escape from the piston. U.S. Pat. No. 4,507,103 discloses a hydraulic tensioner with a check valve and vent in series. The check valve has a low opening pressure so that fluid flows from the high pressure chamber through the check valve and then to the tortuous vent path to atmosphere.

SUMMARY OF THE INVENTION

The present invention is directed to a hydraulic tensioner with a plastic cap that is fitted over the nose of the piston to form a vent or check valve. The cap is permitted to move back and forth over small distances in the axial direction with respect to the piston. Oil and air that leave the high pressure chamber fill the cap and, when the pressure reaches a predetermined maximum, the cap lifts off of the piston tip and permits oil and air to escape.

In one embodiment, the hydraulic tensioner includes a housing with a central bore. A hollow plunger or piston is slidably received within the bore. A source of pressurized fluid, or reservoir, is formed outside of the hollow piston. A one-way check valve is mounted in the base of the housing or below the open end of the piston. A high pressure fluid chamber is formed in the area formed by the hollow piston and the bore. A one-way check valve permits fluid flow from the reservoir into the high pressure chamber of the piston and restricts flow in the reverse direction out of the piston.

Upon outward movement of the piston by the spring, a pressure differential forms across the check valve and fluid flows from the reservoir or other fluid source and through the check valve into the high pressure chamber. The piston moves outward until the inward force on the piston from the chain is balanced by the outward resistance force of the spring and resistance force from the fluid in the high pressure chamber.

The plastic cap is located at the upper end of the piston. The piston may be formed so that the piston spring presses against a portion of the piston that is below the plastic cap. When the engine is not operating, the force of the piston spring against the piston, in conjunction with the force of the tensioner arm against the cap, should be sufficient to cause the cap to close against the piston and prevent the escape of oil. During operation of the engine, the force of the oil and air that accumulate in the cap should increase to a level sufficient to cause the cap to move away from the piston and permit the escape of the oil and air. Alternatively, a low rate spring may be placed between the cap and the top of the piston to cause the cap to move away from the piston.

For a better understanding of these and other aspects and objects of the invention, references should be made to the following detailed description taken in conjunction with the accompanying drawings.

BRIEF DESCRIPTION OF THE DRAWINGS

FIG. 1 is a sectional view of the preferred embodiment of the hydraulic tensioner of the present invention illustrating, the plastic cap vent at the top of the piston.

FIG. 2 is an exploded view of the top portion of the piston of FIG. 1 illustrating the plastic cap vent.

FIG. 3 is an exploded view of an alternative embodiment of the present invention with a low rate spring placed between the cap and the piston.

DETAILED DESCRIPTION OF THE PREFERRED EMBODIMENTS

Turning now to the drawings, the present invention is directed to a hydraulic tensioner with a plastic cap vent or check valve. The tensioner includes a generally cylindrical, hollow piston that is slidably received in a bore in a housing. A one-way check valve is mounted at the bottom of the housing. The check valve regulates fluid flow into the high pressure fluid chamber between the check valve and the interior of the piston and bore.

The piston is biased outward from the bore by a piston spring. The spring is mounted within the high pressure fluid chamber on the inside of the piston. Hydraulic fluid is supplied from an external source of pressurized fluid to the piston through an aperture in the housing and then through the check valve. The check valve regulates the flow of hydraulic fluid from a reservoir or other source of pressurized fluid into the high pressure chamber while preventing flow in the reverse direction.

FIG. 1 illustrates one embodiment of the present invention. The hydraulic tensioner 10 includes both a piston spring and a check valve. The tensioner 10 includes a cylindrical housing 20 having a bore 23 in its center to provide an opening for the piston. The housing may be a cartridge housing having threads on the outside of the housing so that it can be received in a threaded bore in the engine block.

A hollow cylindrical piston, or plunger, 40 is slidably mounted concentrically in the bore 23 of the housing. The hollow cylindrical piston 40 has an upper end 41, which is closed by a plastic cap 50, a lower end 42, and sides 43 and 44. A one-way check valve 100 is mounted in the lower end of the housing. A high pressure fluid chamber 22 is formed between the check valve and the interior of the piston and bore. The size of the high pressure chamber 22 increases as the piston moves outward.

A piston spring 60 biases the piston 40 in an protruding or outward direction from the bore 23. The spring is mounted inside the housing and rests on the top of the check valve 100. The other end of the spring rests against the inner surface of a vent valve 52 with a tortuous path which is fit within the top of the piston 40. The spring 60 contacts the inside of vent valve. The plastic cap is snap fit or pressed on the open end of the piston.

The plastic cap may be attached to the top of the piston by any means known in the art. The plastic cap is permitted to move small distances in the axial direction by the spacing between the tabs 54,56 at the ends of the cap and the corresponding groove 58 formed in the top of the piston. The cap includes a small opening or openings 61,62 that permit venting of oil and air to the atmosphere.

The check valve 100 is preferably mounted in the housing opposite the open end 42 of the piston 40. The one way check valve 100 permits the flow of fluid to the (high pressure) fluid chamber 22 from the (low pressure) reservoir or source of pressurized fluid (not shown) through opening 70 when a pressure differential is created across the valve. The check valve 100 preferably includes a ball 102 and spring 103 biasing the ball 102 toward a ball seat 104 away from a bracket or cage 105. A check valve seal 106 is placed at the base of the valve in the housing. Alternatively, the check valve 100 may also be a variable orifice check valve as shown and described in U.S. Pat. No. 5,259,820 and U.S. Pat. No. 5,277,664, both of which are owned by the assignee of the present application and which are incorporated herein by reference. The exact configuration of the check valve will ultimately depend of the dynamic response desired.

The plastic vent with the tortuous path may be of the type disclosed in Hunter et al. U.S. Pat. No. 5,346,436, or Smith U.S. Pat. No. 5,718,650, both of which are incorporated herein by reference. Other types of vents are also possible. Alternatively, the passage in the top of the piston may be made sufficiently small in diameter in order to serve as a vent.

Oil and air will flow past the plastic vent when the engine is not in operation, and the tensioner is of the type installed so that the piston points in a downward direction. When not in operation, the closed cap will prevent the accumulating oil from escaping the piston top. when the engine begins operation, the tensioner arm moves slightly away from the top of the plastic cap. Accumulation of sufficient amount of oil and air in the space between the cap and piston will cause the cap to move off of the piston and permit the oil and air to escape through the oil passage hole or apertures. The oil and air must accumulate to form sufficient pressure in order to overcome the resistance force of the chain and tensioner arm against the cap. That resistance force lessens when the engine begins operation and the tensioner arm moves away from the cap. Prior to the tightening of the chain to place a strong resistance force against the cap, such as during normal engine operating conditions, the accumulated oil and air can be quickly purged from within the cap by the outward movement of the cap.

In FIG. 3, an alternative embodiment of the present invention is shown in which a low spring rate spring 80 is placed between the cap 50 and the top of the piston 40. The low rate spring provides additional force to permit movement of the cap off of the piston. The low rate spring may be biased against the piston by placing the spring 80 in an integrally formed groove 82 in the upper end of the piston.

During start-up of the hydraulic chain tensioner 10, the tensioner arm moves away from the piston. This permits the cap to open, or move outward, and expel the accumulated oil and air. Further outward movement of the tensioner arm permits the piston to move outward and a low pressure condition is created in the high pressure chamber 22, which causes fluid to enter through check valve 100 and begin to fill the high pressure chamber 22. The pressure differential across the check valve 100 opens the valve and allows positive fluid flow into the high pressure chamber 22. Once steady state operation of the engine occurs the inward force of the chain on the piston balances the resistance force of the fluid and spring, the check valve 100 closes, and prevents back flow out of the high pressure chamber 22. During operation, the force of the chain against the piston 40 is balanced by the force of the spring 60 and the pressurized fluid in the high pressure chamber 22.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention, is therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:

a housing having a bore;

a hollow piston slidably received within said bore and defining a fluid chamber with said bore, said piston having an upper end, said piston upper end having an aperture, said piston aperture forming a conduit for fluid communication from said fluid chamber to the outside of said piston;

a piston spring located within said hollow piston, said piston spring biasing said piston in a protruding direction from said bore;

a check valve provided between the fluid chamber and a source of pressurized fluid, said check valve permitting fluid flow into said fluid chamber while restricting flow in the reverse direction;

a plastic cap member located at the upper end of said piston above said piston aperture, said plastic cap member having an aperture to permit the flow of fluid through said plastic cap member, said plastic cap member being axially translatable between a first closed position in which fluid is prevented from exiting through said plastic cap aperture, and a second open position in which fluid is permitted to flow through said plastic cap aperture and out of said plastic cap member.

2. The hydraulic tensioner of claim 1, wherein said plastic cap member includes a radially extending tab member and said piston upper end includes a radially formed groove, said tab member being positioned within said groove.

3. The hydraulic tensioner of claim 2, wherein said tab member is axially translatable within said groove, said axial translation of said tab member being equal in distance to the axial translation of said plastic cap member.

4. The hydraulic tensioner of claim 1, further comprising a vent member located within the upper end of said piston, said vent member being biased against said upper end of said piston by said piston spring.

5. The hydraulic tensioner of claim 1, wherein said plastic cap aperture further comprises a plurality of holes to permit the flow of fluid through said plastic cap member.

6. The hydraulic tensioner of claim 5, wherein said plastic cap aperture holes are located radially outward from said piston upper end.

7. The hydraulic tensioner of claim 1, further comprising a second spring positioned between said plastic cap member and said upper end of said piston, said second spring acting to bias said plastic cap member away from said piston upper end.

8. The hydraulic tensioner of claim 7, wherein said upper end of said piston includes a groove integrally formed within said piston upper end, said second spring being positioned within said groove.

* * * * *